(12) United States Patent
Schiappelli et al.

(10) Patent No.: US 9,392,661 B2
(45) Date of Patent: Jul. 12, 2016

(54) LOW-OVERHEAD CURRENT GENERATOR FOR LIGHTING CIRCUITS

(71) Applicant: Dialog Semiconductor (UK) Limited, Reading (GB)

(72) Inventors: Fulvio Schiappelli, Pullach im Isartal (DE); Jiri Ledr, Germering (DE); Alessandro Angeli, Munich (DE); Andrea Acquas, Florence (IT)

(73) Assignee: Dialog Semiconductor (UK) Limited, Reading (GB)

( * ) Notice: Subject to any disclaimer, the term of this patent is extended or adjusted under 35 U.S.C. 154(b) by 0 days.

(21) Appl. No.: 14/644,438

(22) Filed: Mar. 11, 2015

(65) Prior Publication Data

US 2016/0095181 A1  Mar. 31, 2016

(30) Foreign Application Priority Data

Sep. 30, 2014  (DE) .......................... 10 2014 219 840

(51) Int. Cl.
*H05B 33/08* (2006.01)
(52) U.S. Cl.
CPC ........ *H05B 33/0851* (2013.01); *H05B 33/0815* (2013.01); *H05B 33/0845* (2013.01); *H05B 33/0812* (2013.01)
(58) Field of Classification Search
USPC ............. 315/209 R, 291, 307–326, 224, 247, 315/185 S
See application file for complete search history.

(56) References Cited

U.S. PATENT DOCUMENTS

| 6,285,139 | B1 * | 9/2001 | Ghanem ............ G01R 31/2653 307/60 |
| 8,334,662 | B2 | 12/2012 | Jin et al. |
| 8,502,459 | B2 * | 8/2013 | Son ................... H05B 33/0815 315/185 R |
| 2005/0280375 | A1 * | 12/2005 | Chikugawa ........ H05B 33/0818 315/291 |
| 2008/0068066 | A1 | 3/2008 | Mittal |
| 2013/0114016 | A1 * | 5/2013 | Lim ................... H05B 33/0827 349/43 |
| 2013/0249421 | A1 | 9/2013 | Cavallini et al. |
| 2014/0152180 | A1 | 6/2014 | Wolf et al. |
| 2014/0210365 | A1 | 7/2014 | Kim et al. |

OTHER PUBLICATIONS

German Office Action and translation 10 2014 219 840.2, May 12, 2015, Dialog Semiconductor (UK) Limited.

* cited by examiner

*Primary Examiner* — Tuyet Vo
(74) *Attorney, Agent, or Firm* — Saile Ackerman LLC; Stephen B. Ackerman (57) ABSTRACT

This application relates to a lighting system comprising a plurality of light emitting diode, LED, circuits, and a power source for providing a drive voltage to the plurality of LED circuits. For each LED circuit, the lighting system comprises a first variable resistance element connected between the respective LED circuit and ground, and a first feedback circuit configured to control a voltage at a first node between the respective LED circuit and the respective first variable resistance element to a first voltage. The lighting system further comprises a current source and a second variable resistance element connected between the current source and ground, wherein each first variable resistance element is configured to attain a resistance value depending on a resistance value attained by the second variable resistance element.

18 Claims, 5 Drawing Sheets

LOW-OVERHEAD CURRENT GENERATOR FOR LIGHTING CIRCUITS

TECHNICAL FIELD

This application relates to a current generator for lighting systems. In particular, it relates to a current generator for LED lighting systems with a plurality of LED strings. Further in particular, the application relates to a low-overhead, power-efficient, low differential non-linearity (DNL), dithering free, current source for a LED lighting system.

BACKGROUND

Light-emitting diodes (LED) are semiconductor light sources traditionally used as indicator lamps in many devices. In addition, LEDs are being increasingly used also for lighting, where one particular use is for providing backlighting. For example, LED backlighting is being increasingly used for liquid crystal displays (LCDs), as LCDs do not produce their own illumination. Furthermore, LED backlight lighting systems are becoming increasingly common for the use in display backlighting and keypad backlighting in portable devices such as cell phones, smartphones, PDAs, digital cameras, personal navigation devices and other portable devices with keypads and/or LCD displays.

LED lighting systems are generally associated with a variety of advantages over traditional lighting sources such as incandescent lighting. For example, LEDs are efficient, associated with longer life, exhibit faster switching and produce less heat than traditional lighting sources. Due to the faster switching characteristics of LEDs, they are suitable for use in fast and highly responsive circuits by allowing for both quick response/start-up time and the capability to be operated at high frequency, further allowing for such enhancements as frequency modulation in order to reduce power consumption.

LED lighting systems typically comprise "strings" of stacked LEDs (also referred to as LED strings or LED circuits in the following) in which multiple LEDs are connected in series. An LED driver control circuit provides a regulated high supply voltage to the LED strings of stacked LEDs. A common practice to control the current that flows in each of the LED strings is to pull a well-defined current from the cathode side of each LED string, via programmable current sources. In order to protect the system components from excessive voltage levels and avoid excessive high current to flow in the LED circuit, an overvoltage protection mechanism is generally provided to disable the delivery of power to the circuit in the event that the voltage rises above a certain threshold.

Figure 1:
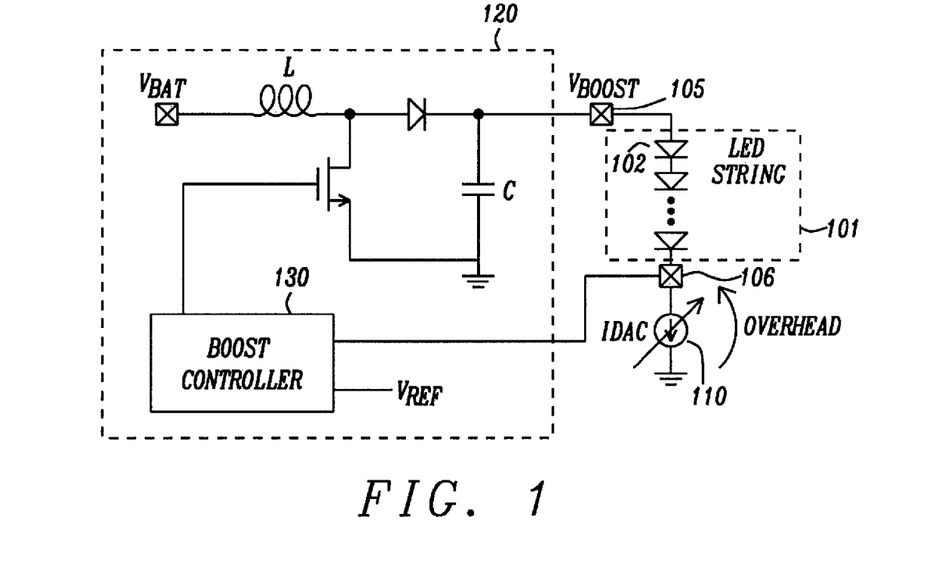
FIG. 1 shows a circuit diagram of a conventional LED lighting system for a plurality of LED strings with a feedback mechanism for controlling the drive voltage.

FIG. 1 schematically illustrates a conventional LED lighting system 100. This LED lighting system 100 comprises a plurality of LED strings 101 (of which only one is shown in FIG. 1 for illustrative purposes), each LED string 101 comprising a plurality of LEDs 102. Typically, a LED string 101 may comprise up to six or more LEDs 102, and the LED lighting system 100 may comprise up to 12 or more LED strings 101. An IDAC (current digital-to-analog converter) current generator 110, which is an example of a programmable current source, is provided for each LED string 101 at the cathode side of the respective LED string 101. The IDAC current generators 110 allow sourcing a well-defined current to each LED string 101. The LED lighting system 100 illustrated in FIG. 1 further comprises a boost regulator circuit 120 (power source) that comprises a boost controller 130 and is adapted to provide a regulated boost voltage (supply voltage, drive voltage) to each of the LED strings 101, or in more detail, to a boost voltage node 105 at the anode side of each LED string 101. A feedback voltage from a feedback node 106 at the cathode side of each LED string 101 is provided to the boost regulator circuit 120. The boost regulator circuit 120 is adapted to boost a battery voltage to a supply voltage that is higher than the battery voltage and to regulate the voltage at the feedback node 106 at the cathode side of each LED string by performing feedback control in accordance with the feedback voltages received from the LED strings 101. Although this embodiment and also the further embodiments described above make reference to the boost regulator circuit 120, it is to be understood that also other means may be employed for supplying an appropriate drive voltage to the plurality of LED circuits 101.

In the LED lighting system 100 illustrated in FIG. 1, each LED string's 101 current $I_{LED}$ is programmed by a respective IDAC current generator 110. The voltage drop (overhead) across each IDAC current generator 110 (i.e. the voltage drop between the feedback node 106 and ground) times the respective current, multiplied by the number of LED strings 101, results in a dissipation of power which should be minimized in order to increase the overall boost efficiency.

In more detail, the total dissipated power resulting from the overhead consumption is given by $$P_{diss} = V_{LED} \cdot I_{LED} \cdot N_{str},$$

where $V_{LED}$ is the voltage at the feedback node 106, $I_{LED}$ is the current flowing through each LED circuit 101, and $N_{str}$ is the number of LED circuits 101. Here, and in the following, unless not indicated otherwise, all voltages are understood to be given with reference to ground. Thus, in order to increase the efficiency of the boost regulator circuit 120, the overhead needs to be reduced.

Prior art lighting systems employ a plurality of current mirrors, one or more for each LED string 101, for sourcing the well-defined current to each LED string 101. Each current mirror is configured to mirror a respective reference current to the cathode side of the respective LED string 101. Conventionally, cascoded current generators that work in saturation are used for forming the current mirrors.

These lighting systems have the drawback that a high voltage drop over the current generators occurs, i.e. that a high overhead is present, at the cost of system efficiency. Typically, the voltage drops are not lower than several hundred mV (600 to 800 mV or higher). Moreover, each LED string 101 has its own diode connected reference current branch, which multiplied by the number of LED strings 101 results in considerable quiescent current consumption e.g. from a battery of the lighting system, again at the cost of system efficiency. In case that further LED strings 101 were to be added to the lighting system, the quiescent current consumption would rise proportionally, thus even more degrading system efficiency. In other words, conventional lighting systems have poor scalability as regards quiescent current consumption and also as regards area of circuitry.

A further drawback of conventional lighting systems is that the respective IDACs, for which the current programmability is implemented by binary coding, display poor performance as regards DNL, with plural DNL peaks, both in the positive and negative directions, across the current range of the respective IDACs. This problem is due to an unavoidable mismatch of device components and hard-to-achieve current trimmability throughout the current range of the respective IDACs.

SUMMARY

There is a need for means and a method for controlling a current in a plurality of LED strings of a LED lighting system that result in low overhead and high scalability, i.e. that minimize quiescent current consumption regardless of the number of LED strings in the LED lighting system. Further, there is a need for such means and method that improve DNL performance and that do not compromise pulse width modulation (PWM) operation of the LED strings. In view of this problem, the present invention provides a lighting system, a control method of a lighting system, a programmable current source and a control method of a programmable current source having the features of the respective independent claims.

An aspect of the present invention relates to a lighting system comprising: a plurality of light emitting diode, LED, circuits; a power source for providing a drive voltage to the plurality of LED circuits; for each LED circuit, a first variable resistance element connected between the respective LED circuit and ground; for each LED circuit, a first feedback circuit configured to control a voltage at a first node between the respective LED circuit and the respective first variable resistance element to a first voltage; a current source; and a second variable resistance element connected between the current source and ground, wherein each first variable resistance element is configured to attain a resistance value depending on a resistance value attained by the second variable resistance element. In other words, each first variable resistance element and the second variable resistance element are coupled and the resistance values of the first variable resistance elements can be controlled in accordance with the resistance value of the second variable resistance element, e.g. by controlling the resistance value of the second variable resistance element. For instance, the first variable resistance elements may mirror the resistance value of the second variable resistance element with a given (yet possibly variable) mirror ratio, so that the resistance values of the first variable resistance elements and the resistance value of the second variable resistance element may have the given (yet possibly variable) mirror ratio.

Configured as above, by appropriately controlling the voltage at the first node to the first voltage, a very low overhead can be achieved for each LED circuit, and the amount of dissipated power can be considerably reduced. Since the lighting system does not rely on current mirrors comprising transistors that are operated in saturation, the first voltage may be set considerably lower than what would be possible in the context of prior art lighting systems. Accordingly, boost power efficiency can be considerably increased. Moreover, since a single reference current branch, to which a plurality of LED circuits may be connected, is required, quiescent current consumption of the second variable resistance element only occurs once, regardless of a number of LED circuits. Thereby, high scalability as regards quiescent current consumption is achieved. For the same reason, also high scalability as regards area of circuitry is achieved. In addition, accuracy of PWM control of the LED strings, e.g. as regard timing, is not compromised by the above setup.

The lighting system may comprise a second feedback circuit configured to control a voltage at a second node between the current source and the second variable resistance element to a second voltage. The first voltage may correspond to the voltage at the second node or to the second voltage. The former choice may be made in order to account for an offset in the second voltage and the voltage at the second node. Further, the second variable resistance element may be configured to attain a resistance value in dependence on a current output by the current source. The current source may be controllable to provide a controlled current. Thereby, appropriate control of the voltage at each first node can be achieved, i.e. the voltage at each first node can be made equal to the voltage at the second node. This enables accurate control of the currents flowing through the first variable resistance elements.

Each first variable resistance element may be configured such that a ratio between the resistance value of the respective first variable resistance element and the resistance value of the second resistance element corresponds to a ratio among a set of predetermined ratios. Accordingly, in addition to performing control of the current output by the current source, the currents flowing through the LED circuits may also be controlled by varying the above ratio. Thereby, for a given current resolution, the current source may be simplified.

Each of the first variable resistance elements of the LED strings may comprise a first transistor element. The second variable resistance element may comprise a second transistor element. Each first transistor element and the second transistor element may be biased to operate in the triode region. For each first transistor element, a gate terminal of the respective first transistor element may be connected to a gate terminal of the second transistor element. The gate terminal of the second transistor element may be connected to a third node between a source terminal of the second transistor element and the current generator. Configured as above, variable resistance elements that are easily controllable can be achieved, and the current flowing through the LED circuits can be easily controlled. By operating the transistor elements in the triode region, the voltage drop over the transistor elements may be considerably reduced compared to the prior art.

In embodiments, the current source is a programmable current source configured to output an output current in accordance with a digital input code representing a numerical value by performing switching operation in accordance with the digital input code. A predetermined number of bits on the least significant bit, LSB, side of the digital input code may be switched in accordance with binary coding; and a remaining number of bits on the most significant bit, MSB, side of the digital input code may be switched in accordance with unary coding (i.e. thermometric coding, or thermometer coding, as explained later).

Configured as above, sufficient current precision and resolution can be achieved, while on the other hand the area of the current source can be reduced. Further, the DNL performance of the current source is improved compared to the prior art in that the DNL can be kept small and strictly positive across the whole range of numerical values represented by the digital input code, i.e. across the whole current range.

The current source may comprise a plurality of current branches that are switchable in accordance with the digital input code, the output current corresponding to a sum of currents of those current branches that are switched to a conducting state (on state). A first group of current branches corresponding to the predetermined number of bits on the LSB side of the digital input code may be switched in accordance with the predetermined number of bits on the LSB side of the digital input code, each current branch of the first group of current branches being configured to conduct a current that is in accordance with a bit numbering of the respective corresponding bit of the predetermined number of bits on the LSB side of the digital input code. A second group of current branches configured to conduct substantially equal currents may be switched in accordance with the remaining bits on the MSB side of the digital input code. The current branches of the second group of current branches may be consecutively switched to the conducting state in accordance with an increasing value of the numerical value represented by the digital input code. If the digital input code is representative of an L-bit numerical value, and the predetermined number of bits on the LSB side of the digital input code is denoted by M, the first group of current branches may comprise M current branches that are configured to conduct currents of substantially $(2^0) \cdot I_0, (2^1) \cdot I_0, \ldots, (2^{M-1}) \cdot I_0$, respectively, $I_0$ being a base current, and the second group of current branches may comprise at least $(2^{L-M})-1$ current branches that are each configured to conduct a current of substantially $(2^M) \cdot I_0$.

In embodiments, the lighting system further comprises, for each LED circuit: a first switching element switchable in accordance with a pulse width modulation, PWM, signal and connected between the respective first node and the respective first variable resistance element; and a second switching element provided in the respective first feedback circuit and configured to disconnect the respective first feedback circuit when the first switching element is switched to an open state, i.e. to a state in which the first switching element is open and substantially does not conduct a current. Thereby, accurate PWM control of the lighting system can be implemented without compromising the above advantages relating to overhead reduction and improvement of DNL performance. It must be noted that this aspect can be used independently of the previous aspects and has independent advantages such as providing accurate PWM control of the lighting system.

The lighting system may comprise, for each LED circuit: a third transistor element provided in the respective first feedback circuit and connected between the respective first node and the respective LED circuit; a capacitor element connected between a gate terminal of the third transistor element and ground; a third switching element configured to disconnect, in conjunction with the second switching element, the third transistor element and the capacitor element from the respective first feedback circuit when the first switching element is switched to the open state. The lighting system may further comprise, for each LED circuit: an operational amplifier element provided in the respective first feedback circuit and connected with its output terminal to the gate terminal of the respective third transistor element via the respective third switching element; a fourth switching element configured to short-circuit the differential input terminals of the operational amplifier element when the first switching element is switched to the open state. The lighting system may yet further comprise a fifth switching element connected between the second node and the second variable resistance element, wherein the fifth switching element is of the same type as each first switching element. Accordingly, accurate PWM control can be achieved regardless of a settling time of the circuitry of the first feedback circuit.

In embodiments, the lighting system further comprises controlling means for controlling the current source and each first variable resistance element. The controlling means may be configured to control, for each first variable resistance element, a ratio between the resistance value of the respective first variable resistance element and the resistance value of the second variable resistance element to a first ratio if a numerical value represented by the digital input code is below a numerical threshold value, and to a second ratio smaller than the first ratio if the numerical value is not below the numerical threshold value.

By this configuration, current resolution can be increased without incurring the need to suffer a corresponding increase in area of the current source. Further, being able to vary the above ratio enables accurate trimming of the current flowing through the LED circuits for each LED circuit separately.

Another aspect of the present invention relates to a method of controlling a lighting system according to the foregoing aspect, the method comprising: converting a target luminosity of the lighting system to digital input code and inputting the digital input code to the programmable current source. The method may further comprise determining whether the numerical value represented by the digital input code is below a numerical threshold value. The method may further comprise controlling, for each first variable resistance element, a ratio between the resistance value of the respective first variable resistance element and the resistance value of the second variable resistance element to a first ratio if the numerical value is below the numerical threshold value, and controlling, for each first variable resistance element, the ratio between the resistance value of the respective first variable resistance element and the resistance value of the second variable resistance element to a second ratio smaller than the first ratio if the numerical value is not below the numerical threshold value. The method may further comprise controlling the programmable current source to reduce the output current in accordance with a reduction in the ratio between the resistance value of the first variable resistance elements and the resistance value of the second variable resistance element.

Another aspect of the present invention relates to a lighting system comprising: a light emitting diode, LED, circuit, a power source for providing a drive voltage to the LED circuit; and programmable current source connected between the LED circuit and ground and configured to output an output current in accordance with a digital input code representing a numerical value. The programmable current source may comprise switching means for performing a switching operation in accordance with the digital input code. The switching means may be adapted to switch a predetermined number of bits on the least significant bit, LSB, side of the digital input code in accordance with binary coding, and to switch a remaining number of bits on the most significant bit, MSB, side of the digital input code in accordance with unary coding.

The programmable current source in the above lighting system may further comprise a plurality of current branches that are switchable by the switching means in accordance with the digital input code, the output current corresponding to a sum of currents of those current branches that are switched to a conducting state. The switching means may be adapted to switch a first group of current branches corresponding to the predetermined number of bits on the LSB side of the digital input code in accordance with the predetermined number of bits on the LSB side of the digital input code, each current branch of the first group of current branches being configured to conduct a current that is in accordance with a bit numbering of the respective corresponding bit of the predetermined number of bits on the LSB side of the digital input code. The switching means may be adapted to switch a second group of current branches configured to conduct substantially equal currents in accordance with the remaining bits on the MSB side of the digital input code. The switching means may be adapted to switch current branches of the second group of current branches consecutively to the conducting state in accordance with an increasing value of the numerical value represented by the digital input code. If the digital input code is representative of an L-bit numerical value, and the predetermined number of bits on the LSB side of the digital input code is denoted by M, the first group of current branches may comprise M current branches that are configured to conduct currents of substantially $(2^0) \cdot I_0, (2^1) \cdot I_0, \ldots, (2^{M-1}) \cdot I_0$, respectively, $I_0$ being a base current, and the second group of current branches may comprise at least $(2^{L-M})-1$ current branches that are each configured to conduct a current of substantially $(2^M) \cdot I_0$.

Another aspect of the present invention relates to a method of controlling, in the above lighting system, a programmable current source configured to output an output current in accordance with a digital input code representing a numerical value by performing a switching operation in accordance with the digital input code, the method comprising: switching a predetermined number of bits on the least significant bit, LSB, side of the digital input code in accordance with binary coding; and switching a remaining number of bits on the most significant bit, MSB, side of the digital input code in accordance with unary coding.

In the above, the programmable current source may comprise a plurality of current branches that are switchable by the switching means in accordance with the digital input code, wherein the output current corresponds to a sum of currents of those current branches that are switched to a conducting state. The method may further comprise: switching a first group of current branches corresponding to the predetermined number of bits on the LSB side of the digital input code in accordance with the predetermined number of bits on the LSB side of the digital input code, each current branch of the first group of current branches being configured to conduct a current that is in accordance with a bit numbering of the respective corresponding bit of the predetermined number of bits on the LSB side of the digital input code; and switching a second group of current branches configured to conduct substantially equal currents in accordance with the remaining bits on the MSB side of the digital input code. Switching the second group of current branches may involve switching current branches of the second group of current branches consecutively to the conducting state in accordance with an increasing value of the numerical value represented by the digital input code.

If the digital input code is representative of an L-bit numerical value, and the predetermined number of bits on the LSB side of the digital input code is denoted by M, the first group of current branches comprises M current branches that are configured to conduct currents of substantially $(2^0) \cdot I_0$, $(2^1) \cdot I_0, \ldots, (2^{M-1}) \cdot I_0$, respectively, $I_0$ being a base current, and the second group of current branches comprises at least $(2^{L-M})-1$ current branches that are each configured to conduct a current of substantially $(2^M) \cdot I_0$. The method may comprise, upon an increase of the numerical value represented by the digital input code: if a number of current branches of the second group of current branches that are in the on state is smaller than a largest integer divisor of a target output current corresponding to the numerical value represented by the digital input code and the current of substantially $(2^M) \cdot I_0$, switching current branches of the second group of current branches to the on state so that the number of current branches of the second group of current branches that are in the on state matches said largest integer divisor, but not switching any one of the current branches of the second group of current branches from the on state to the off state; and switching one or more of the current branches of the first group of current branches, so that the output current substantially matches the desired output current corresponding to the numerical value represented by the digital input code.

It will be appreciated that the method steps and apparatus features may be interchanged in many ways. In particular, the details of the disclosed apparatus can be implemented as a method, and the disclosed method steps implemented as apparatus features, as the skilled person will appreciate.

BRIEF DESCRIPTION OF THE DRAWINGS

The invention is explained below in an exemplary manner with reference to the accompanying drawings, wherein.

DETAILED DESCRIPTION

Embodiments of the present invention will be described in the following with reference to the accompanying figures, wherein in the figures, identical objects are indicated by identical reference numbers. It is understood that the present invention shall not be limited to the described embodiments, and that the described features and aspects of the embodiments may be modified or combined to form further embodiments of the present invention.

Figure 2:
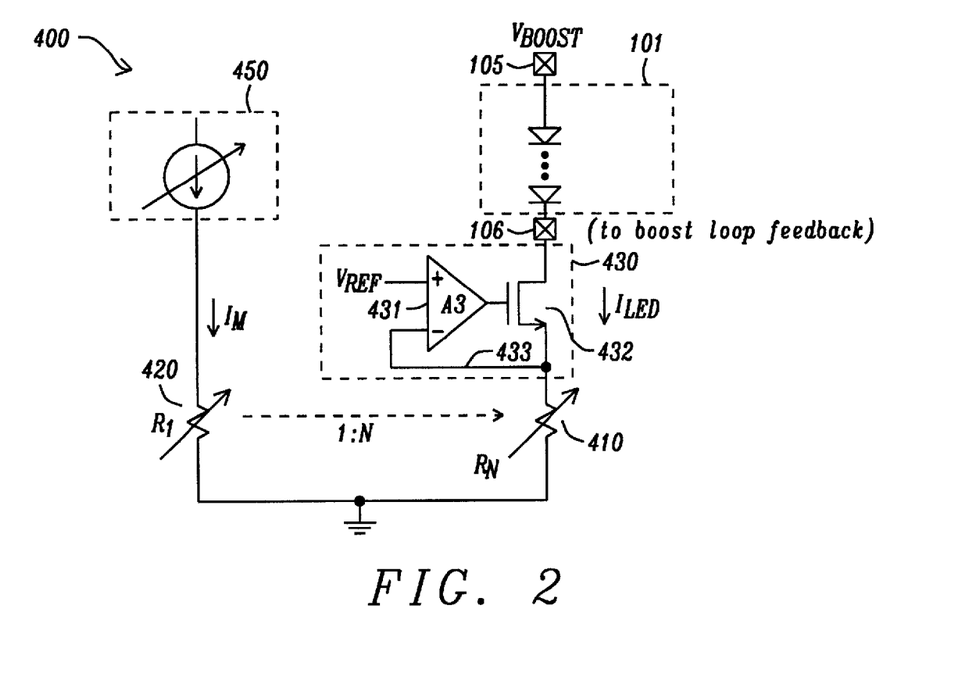
FIG. 2 schematically shows a circuit diagram of an LED lighting system according to a first embodiment of the invention.

FIG. 2 shows a circuit diagram of a schematic representation of a lighting system 400 according to a first embodiment of the invention. The boost regulator circuit 120 (power source) is not illustrated in this schematic representation. It is to be understood however that an appropriate voltage is supplied to boost voltage node 105 by the boost regulator circuit 120 and that a feedback voltage taken from the cathode side of each LED string 101 is supplied to the boost regulator circuit 120. Further, although FIG. 2 exemplarily shows a single LED circuit 101, it is to be understood that the lighting system 400 may comprise a plurality of LED circuits 101, along with a corresponding number of first feedback circuits 430 (explained below) and a corresponding number of first variable resistance elements 410 (explained below).

The lighting system 400 comprises one or more LED circuits 101, a power source supplying a drive voltage to the plurality of LED circuits 101, a current generator 450 outputting a current $I_M$, and a second variable resistance element 420 through which the current $I_M$ output by the current source 450 flows. The lighting system further comprises, for each LED circuit 101, a first variable resistance element 410 and a first feedback circuit (feedback loop) 430. The first feedback circuit 430 may have unit gain and comprises a first operational amplifier 431 (A3) and a transistor element 432. The transistor element 432 may be a transistor, e.g. an NMOS transistor.

For reasons of conciseness, in the following the circuitry formed by a given LED circuit 101, the corresponding first variable resistance element 410 and the corresponding first feedback circuit 430 will be referred to as a first circuit branch, and the circuitry formed by the second variable resistance element 420 and the current source 450 will be referred to as a second circuit branch.

The second variable resistance element 420 is configured to attain a resistance value that depends on the current $I_M$ flowing through the second variable resistance element 420, i.e. the current that is output by the current source 450. In this context, it is to be appreciated that the current source 450 may be a variable current source, e.g. a programmable current source, such as an IDAC.

The first variable resistance element 410 of each first current branch is configured to attain a resistance value that depends on the resistance value attained by the second variable resistance element 420. To this end, each first variable resistance element 410 is linked to the second variable resistance element 420, or controlled conjointly with the second variable resistance element 420. In more detail, each first variable resistance element 410 is configured to attain a resistance value $R_N$ so that a ratio of the resistance value $R_N$ attained by the respective first variable resistance element 410 and the resistance value $R_1$ attained by the second variable resistance element 420, $r=R_N/R_1$ corresponds to one of a set of predetermined ratios. Moreover, the first variable resistance element 410 of each first current branch is configured so that said ratio may be varied from one among the predetermined set of ratios to another one among the predetermined set of ratios. According to a specific, non-limiting example, the ratio $R_N/R_1$ may be either 1/2 or 1/20.

The first feedback circuit 430 of each first circuit branch is configured to control a voltage at a first node 433 between the respective LED circuit 101 and the respective first variable resistance element 410 to a first voltage. The first voltage may be an externally provided reference voltage, or may correspond to a voltage at a second node between the current source 450 and the second variable resistance element 420. To this end, a voltage is taken from the first node 433 and supplied to the first operational amplifier 431. The first operational amplifier 431 compares the voltage taken from the first node 433 to the first voltage. The output of the first operational amplifier 431 is fed to the gate terminal of the transistor element 432. In consequence, the source voltage of the transistor element 432 is regulated by the first feedback circuit 430 and the gate voltage of the transistor element 432 adjusts itself in accordance with the current flowing through the transistor element 432. Thus, the first feedback circuit 430 can be said to correspond to a voltage follower.

By appropriately controlling the voltage at the first node 433 to the first voltage, a very low overhead (less than 200 mV, e.g. about 150 mV) between the feedback node 106 and ground can be achieved, and the amount of dissipated power can be considerably reduced. Since the lighting system 400 does not rely on current mirrors comprising transistors that are operated in saturation, the problems arising in prior art lighting systems as described above can be avoided. Accordingly, boost power efficiency can be considerably increased. Moreover, since a single second circuit branch (reference current branch) is required, to which a plurality of first circuit branches may be connected, quiescent current consumption of the current source 450 only occurs once, regardless of a number of first circuit branches. Thereby, high scalability as regards quiescent current consumption is achieved. For the same reason, also high scalability as regards an area of circuitry is achieved.

Figure 3:
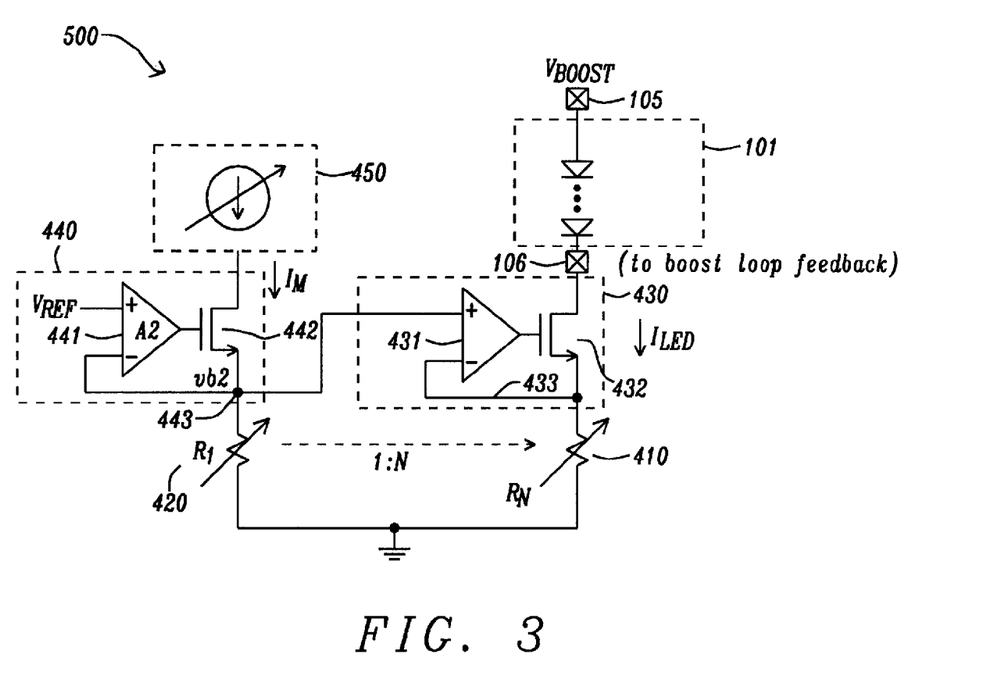
FIG. 3 schematically shows a circuit diagram of an LED lighting system according to a second embodiment of the invention.

FIG. 3 shows a circuit diagram of a schematic representation of a lighting system 500 according to a second embodiment of the invention. The lighting system 500 according to the second embodiment is identical to the lighting system 400 according to the first embodiment, except for the presence of a second feedback circuit (feedback loop) 440. The second feedback circuit 440 is provided between the current generator 450 and the second variable resistance element 420 and comprises a second operational amplifier 441 (A2) and a transistor element 442 at the output of the second operational amplifier 441. The transistor element 442 may be a transistor, e.g. an NMOS transistor. In the following, only the differences with respect to the first embodiment will be described.

A possible implementation is described now. According to this implementation, the second feedback circuit 440 may have unit gain and is configured to control a voltage vb2 at a second node 443 between the second variable resistance element 420 and the current source 450 to a second voltage $V_{REF}$. The second voltage $V_{REF}$ is an externally provided reference voltage. For controlling the voltage vb2 at the second node 443, a voltage is taken from the second node 443 and supplied to the second operational amplifier 441. The second operational amplifier 441 compares the voltage taken from the second node 443 to the second voltage $V_{REF}$. The output of the second operational amplifier 441 is fed to the gate terminal of the transistor element 442. In consequence, the source voltage of the transistor element 442 (i.e. node 443) is regulated by the second feedback circuit 440 to a value very close to $V_{REF}$, the gate voltage of the transistor element 442 adjusting itself in accordance with the current flowing through the transistor element 442. Thus, the second feedback circuit 440 can be said to correspond to a voltage follower.

The first voltage that is supplied to the first operational amplifier 431 in each first circuit branch may be equal to the second voltage $V_{REF}$. Alternatively, as illustrated in FIG. 3, the voltage vb2 taken from the second node 443 is supplied to the first operational amplifier 431 of each first circuit branch as the first voltage. The advantage of the latter configuration is the following: A possible voltage offset of the second operational amplifier 441 affects the voltage vb2 at the second node 443. However, since the voltage vb2 at the second node serves as reference voltage for the first operational amplifiers 431, and the first feedback circuits 430 each have unit gain, said voltage offset of the second operational amplifier 441 affects the voltages at the respective first nodes 433 more or less in the same manner as the voltage vb2 at the second node 443. Thus, the voltage offset of the second operational amplifier 441 can be said to be a common mode contribution to the voltage vb2 at the second node and the voltages at the respective first nodes 433. Thereby, the latter configuration allows to account for an offset in the second operational amplifier 441 that would otherwise result in different voltages being present at the first nodes 433 (one for each first circuit branch) and at the second node 443. Since the offset of the second operation amplifier 441 is a common-mode contribution between the first and second current branches, it does not affect the current mirroring and therefore does not require trimming.

According to this configuration, the currents respectively flowing through the first variable resistance elements 410, and accordingly also flowing through the LED circuits 101 can be appropriately set, while the overhead may be reduced, as explained above.

Figure 4:
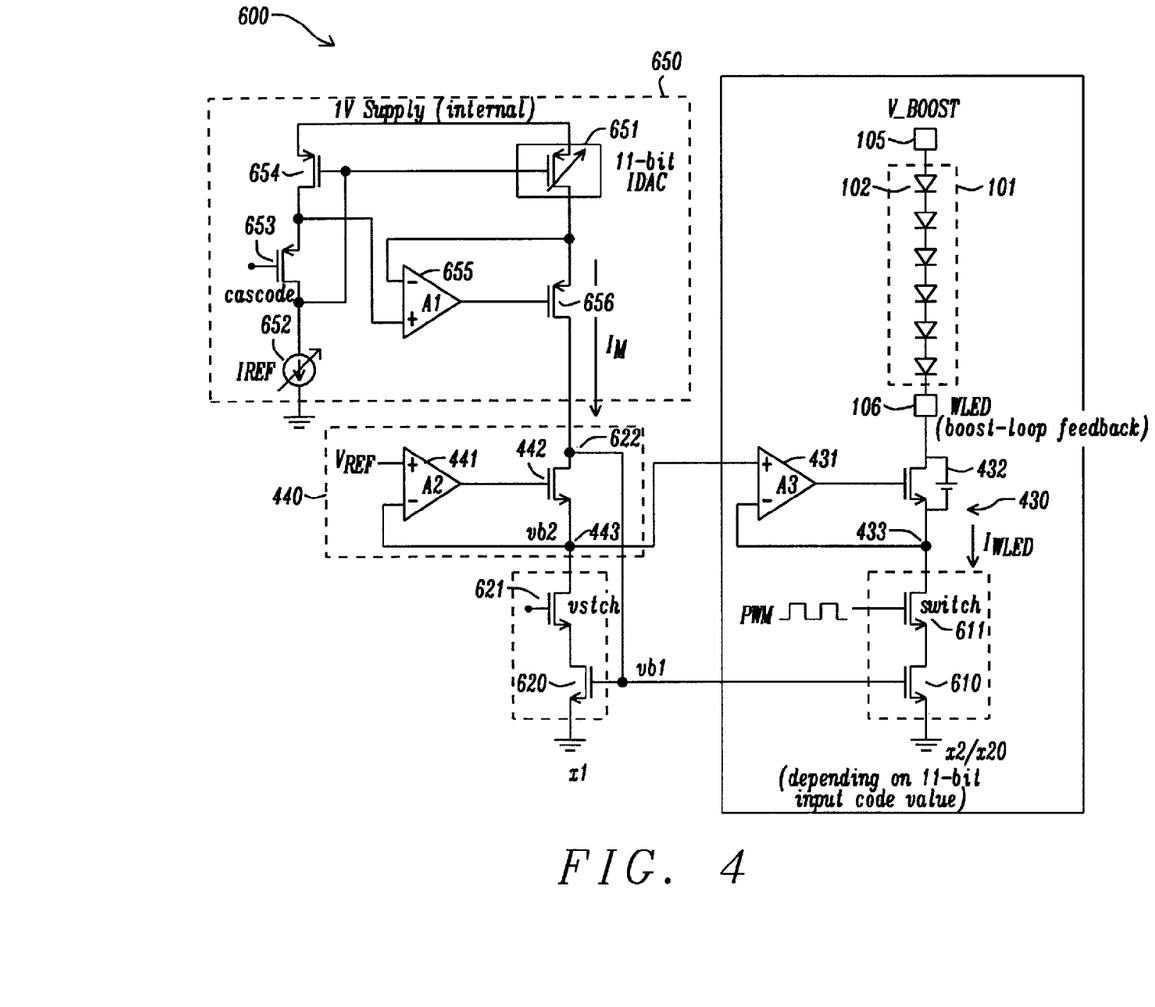
FIG. 4 schematically shows a circuit diagram of an LED lighting system according to a third embodiment of the invention.

FIG. 4 shows a circuit diagram of a schematic representation of a lighting system 600 according to a third embodiment of the invention. The lighting system 600 according to the third embodiment differs from the lighting system 500 according to the second embodiment in that specific implementations of the first and second variable resistance elements and of the current source are provided, and that additional first and fifth switching elements 611, 621 are provided. Therein, it is to be understood that the specific implementation of the first and second variable resistance elements and of the current source are applicable to the first and second embodiments alone or in combination. Also, it is to be understood that either or both of the first and fifth switching elements 611, 621 may be omitted, e.g. if PWM control of the current flowing through the LED circuits 101 is not intended. In the following, only the differences with respect to the first and second embodiments will be described.

In this embodiment, the first variable resistance elements each comprise one or more first transistor elements 610 (e.g. transistors, such as, for example, NMOS transistors), that are operated in the triode region in all conditions, and the second variable resistance element comprises a second transistor element 620 that is operated in the triode region in all conditions. Since the first and second transistor elements 610, 620 are operated in the triode region in all conditions, they respectively correspond to variable resistors. It is to be noted that the second transistor element 620 and the first transistor elements 610 are all of the same type, i.e. have the same properties (specifications, parameters of operation). The source terminals of the first and second transistor elements 610, 620 are respectively connected to ground. For each first circuit branch (i.e. for each LED circuit 101), the gate of each of the one or more first transistor elements 610 is electrically connected to the gate of the second transistor element 620. Accordingly, the same bias voltage vb1 is applied to the gates of the first and second transistor elements 610, 620, and the first and the second transistor elements 610, 620, being operated in the triode region and being of the same type, attain the same resistance value between their respective source and drain terminals. If the first variable resistance elements each comprise more than one first transistor element 610 in parallel, the resistances of the first variable resistance elements and the second variable resistance element may have a ratio different from 1, i.e. smaller than 1.

As indicated above, each first variable resistance element is configured to attain a resistance value $R_N$ so that a ratio of the resistance value $R_N$ attained by the respective first variable resistance element and the resistance value $R_1$ attained by the second variable resistance element, $r=R_N/R_1$ corresponds to one of a set of predetermined ratios. According to a specific, non-limiting example, the ratio $r=R_N/R_1$ may be either 1/2 or 1/20. This is achieved by providing the one or more transistor elements 610 per first variable resistance element. Each first transistor element 610 is part of a respective switchable current branch, the switchable current branches being provided in parallel. These current branches may be switched by dedicated switching elements, or by the first switching elements 611 described below. For each given ratio, a number of current branches depending on the ratio r is switched to the conducting state. For instance, if a ratio $r=R_N/R_1 \leq 1$ is to be obtained, 1/r current branches of the respective first variable resistance element are switched to the conducting state. Accordingly, the total current flowing through the current branches of the respective first variable resistance element (i.e. a sum of parallel currents) corresponds to 1/r times the current $I_M$ flowing through the second variable resistance element.

The gate terminal of the second transistor element 620 is further connected to a third node 622 that is located between the current source 650 and the second transistor element 620, and more specifically, between the current source 650 and the transistor element 442 of the second feedback circuit 440. The voltage vb1 at the gate terminal of the second transistor element 620, and therefore also the source-drain resistance of the second transistor element 620 depends on the current $I_M$ that flows through the second transistor element 620 in accordance with a relationship well-known to the skilled person.

Given the above configuration, it can be said that the combination of the second transistor element 620 and any given first transistor element 610 resembles a current mirror, with the difference that the respective first and second transistor elements 610, 620 are not operated in saturation, as is conventionally the case for current mirrors, but in the triode region. Operating the first and second transistor elements 610, 620 in the triode region instead of in saturation allows setting the voltage at the first and second nodes 443, 433 and thus also at the feedback node 106 to lower values, thus reducing the overhead and improving the overall system efficiency. In the configuration described above, varying the current $I_M$ flowing through the second transistor element 620 varies the current flowing through each first transistor element 610, and accordingly also the current $I_{LED}$ flowing through each LED circuit 101.

For each of the first transistor elements 610 (one or more per LED circuit 101) a first switching element 611 (e.g. an NMOS transistor) is provided at the drain side thereof. The first switching elements 611 can be used for trimming the current flowing through the respective first variable resistance element 610 by switching on and off respective current branches of the first transistor elements 610, and additionally also for applying PWM control to the respective LED circuit 101, as will be described below. By performing PWM control, the current flowing through the respective LED circuit 101 may be periodically disrupted, which results in a user's perception of a warmer color of the light emitted by the LEDs 102. The fifth switching element 621, which is of the same type as each of the first switching elements 611 is provided at the drain side of the second transistor element 620 to ensure equivalence of circuits in the first and second current branches. Accordingly, the fifth switching element 621 is not switched even when PWM control is applied.

The above-described configuration of the lighting system 600 has the advantage that the first and second transistor elements 610, 620 are operated in the triode region, thus acting as variable resistors in all conditions, and that therefore the voltage $V_{LED}$ at the feedback node 106 can be minimized and the system efficiency can be raised by appropriately controlling the voltage at the first node 433. In a specific example, the voltage $V_{LED}$ at the feedback node 106 is regulated to a value as low as 200 mV. The output impedance of the "current mirror" formed by respective first and second transistor elements 610, 620 is enhanced by the first feedback circuit comprising the first operational amplifier 431.

Since each newly added LED circuit 101 (i.e. each newly added first circuit branch) would have to share only two nodes with the second circuit branch, namely nodes for supplying the gate voltage vb1 and the voltage vb2 taken from the second node 443, high scalability along with low quiescent current consumption is guaranteed. In fact, the total consumed quiescent current relates to the current drawn by the current source 650 from a voltage supply. For instance, an internal low voltage (LV) supply may be provided (e.g. derived through a low drop-out (LDO) regulator from an external battery). This current does not change when additional LED circuits 101 are added to the lighting system 600.

Figure 5:
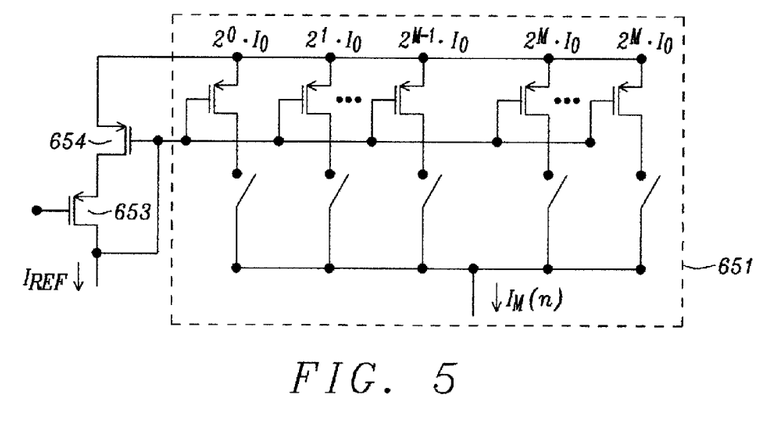
FIG. 5 schematically illustrates a detail of a programmable current generator according to embodiments of the invention.

Next, details of the current source 650, which represents a specific implementation of the current source 450 in the first and second embodiments, will be explained with reference to FIG. 4 and FIG. 5. The (programmable) current source 650 comprises an IDAC 651 (a digital-to-analog converter outputting a programmable current), a cascoded. PMOS transistor 653, 654, a reference current generator 652, a third operational amplifier 655 (A1), and a transistor element 656 (e.g. a PMOS transistor). The reference current generator 652 provides a reference current $I_{REF}$. The reference current $I_{REF}$ is mirrored to the IDAC 651 through the cascoded PMOS transistors 653, 654. A voltage is supplied to the source side of the IDAC 651 and of the cascoded PMOS transistor 654. A third feedback circuit (feedback loop) that may have unit gain and that is formed by the third operational amplifier 655, which preferably has high gain, and the transistor element 656, serves to increase the output impedance of the current source 650. It is to be understood that depending on specific requirements, the third feedback circuit and/or the cascoded PMOS transistors may be omitted from the current source 650.

The IDAC 651 (more generally, the current source 650) receives a digital input code representing a numerical value n and outputs an output current $I_M(n)$ in accordance with the digital input code (or the numerical value n), by performing a switching operation. The digital input code may have arbitrary bit length L. According to a specific example, an 11-bit digital input code is used (L=11). The IDAC 651 (more generally, the current source 650) comprises a plurality of switchable current branches that are provided in parallel and through which, when switched to the conducting state, a given current flows. The output current of the IDAC 651 (more generally, of the current source 650) corresponds to the sum of currents flowing through those switchable current branches that are switched to the conducting state by the switching operation.

An important feature of the IDAC 651 (more generally, of the current source 650) is that it uses mixed thermometric and binary coding.

Conventional IDACs perform switching in accordance with binary coding, i.e. the bits are switched in accordance with binary coding, or put differently, the bits are treated in accordance with binary coding in the switching operation. The conventional IDAC comprises a plurality of parallel switchable current branches, the number of which corresponds to the number of bits of the digital input code. Each of the current branches corresponds to a given one of the bits (bit positions) of the digital input code and, when switched to the conducting state, conducts a current corresponding to the bit numbering (bit endianness) of the corresponding bit times a base current (reference current). By switching the switchable current branches each in accordance with a bit value (i.e. 0 or 1) of the respective corresponding bit of the digital input code, an output current $I_M(n)$ can be output in accordance with the numerical value n represented by the digital input code.

However, when using binary coding for the IDAC, the problem of differential non-linearity (DNL) arises. In the context of the present disclosure, the DNL is defined as $$DNL(n) \equiv (I_M(n+1)/I_M(n)-1) \cdot 100[\%].$$

In an ideal case, the DNL is small and positive for all n. However, for binary coding of the IDAC, for a given transition $I_M(n) \to I_M(n+1)$, a switching of a plurality of current branches may be necessary, possibly resulting in DNL peaks (both positive and negative), if the current branches are not perfectly tuned, e.g. if some mismatches exist between them.

In thermometric coding (thermometer coding, or unary coding) on the other hand, a numerical value n is represented by a bit code having n ones starting from the LSB side and zeros for the remaining bits. Switching the bits in accordance with thermometer coding, or put differently, treating the bits in accordance with thermometer coding in the switching operation means that each current branch, when switched to the conducting state, conducts the same current. Accordingly, for each transition $I_M(n) \to I_M(n+1)$, one or more current branches are switched to the conducting state, while all current branches that have been previously in the conducting state are kept in the conducting state. In other words, when going from $I_M(n)$ to $I_M(n+1)$, one or more current branches are added to the current branches that already provide $I_M(n)$. Evidently, in such a configuration the DNL may not become negative. In modifications of thermometric coding, more than one current branch may be switched to the conducting state, especially for high codes, e.g. in exponential thermometric coding.

However, thermometer-coded IDACs suffer from the drawback that a large number of parallel current branches is required. For an L bit digital input code, the IDAC would be required to comprise at least $(2^L-1)$ current branches, which for large L results in an explosion of the area of circuitry of the IDAC.

According to the present disclosure, the IDAC 651 (more generally, the current source 650) uses mixed thermometric and binary coding. This means that in the switching operation, a predetermined number of bits on the LSB side of the digital input code are treated in accordance with binary coding (i.e. are switched in accordance with binary coding), and that a remaining number of bits on the MSB side of the digital input code are treated in accordance with unary coding (i.e. are switched in accordance with unary coding). More specifically, among the plurality of parallel current branches of the IDAC 651 there is a first group of (parallel) current branches that correspond to the predetermined number of bits on the LSB side of the digital input code. The current branches of the first group are configured to conduct a current in accordance with a bit numbering (bit endianness) of the respective corresponding bit when switched to the conducting state. The current branches of the first group are switched in accordance with a bit value (i.e. 0 or 1) of the respective corresponding bit of the predetermined number of bits on the LSB side of the digital input code.

Further among the plurality of current branches there is a second group of (parallel) current branches that are configured to conduct substantially equal currents when switched to the conducting state. It is to be noted that the current conducted by the current branches of the second group is larger than the highest current that is conducted by any current branch of the first group. The current branches of the second group are switched in accordance with the remaining bits on the MSB side of the digital input code, in accordance with thermometer coding. That is, internally, the remaining bits on the MSB side of the digital input code are converted to digital code in accordance with thermometer coding. This implies that for any given transition from $I_M(n)$ to $I_M(n+1)$, the number of current branches in the second group that are in the conducting state before the transition is equal to or smaller than the number of current branches in the second group that are in the conducting state after the transition. In other words, the current branches of the second group are consecutively switched to the conducting state (but never switched from the conducting state to the non-conducting state) in accordance with an increasing value n of the numerical value represented by the digital input code.

To give an example, if the digital input code is representative of an L-bit numerical value, and the predetermined number of bits on the LSB side of the digital input code is denoted by M, the first group of current branches comprises M current branches that are configured to conduct currents of substantially $(2^0) \cdot I_0$, $(2^1) \cdot I_0$, $(2^{M-1}) \cdot I_0$, respectively, $I_0$ being a base current (the reference current $I_{REF}$), and the second group of current branches comprises at least $(2^{L-M})-1$ current branches that are each configured to conduct a current of substantially $(2^M) \cdot I_0$. An example of the first and second groups of current branches is illustrated in FIG. 5.

In general, a desired output current $I_M(n)$ of the IDAC 651 (or, more generally, the current source 650) may be related to the numerical value n represented by the digital input code by a (piecewise) strictly monotonous increasing function, such as a linear function e.g. with unit gradient and zero offset, an exponential function, or a piecewise defined function with linear variable slope elements, e.g. approximating an exponential function. Depending on the difference between $I_M(n+1)$ and $I_M(n)$, more than one current branches may be switched to the conducting state. For instance, especially for a non-linear monotonous increasing function and high codes n a plurality of current branches of the second group of current branches may be switched to the conducting state. To give an example (with M=4), if output current $I_M(n)$ is given by $9431 \cdot I_0$ and output current $I_M(n+1)$ is given by $9459 \cdot I_0$ for some n, 589 current branches of the second group of current branches are in the on state, and current branches conducting currents $I_0$, $2 \cdot I_0$, $4 \cdot I_0$ of the first group of current branches are in the on state before the transition from n to n+1. In the transition, 2 additional current branches of the second group of current branches are switched to the on state, while the current branches of the first group of current branches are switched so that only the current branches that conduct currents $I_0$, $2 \cdot I_0$ remain in the on state.

In general, the following switching operation may be performed upon an increase of the numerical value represented by the digital input code from n to n', e.g. n'=n+1. If a number of current branches of the second group of current branches that are in the on state is smaller than a largest integer divisor $\lfloor I_M(n')/(2^M \cdot I_0) \rfloor$ of target output current $I_M(n')$ corresponding to the numerical value n' represented by the digital input code and the current of substantially $(2^M) \cdot I_0$, an appropriate number (i.e. $\lfloor I_M(n')/(2^M \cdot I_0) \rfloor - \lfloor I_M(n)/(2^M \cdot I_0) \rfloor$) of current branches of the second group of current branches is switched to the on state so that the number of current branches of the second group of current branches that are in the on state matches said largest integer divisor $\lfloor I_M(n')/(2^M \cdot I_0) \rfloor$. On the other hand, no current branches of the second group of current branches are switched to the off state in the transition from n to n'. At the same time, one or more of the current branches of the first group of current branches are switched (each either from on to off or vice versa), so that the output current substantially matches the desired output current $I_M(n')$ corresponding to the numerical value represented by the digital input code, i.e. so that the sum current conducted by the current branches of the first group of current branches that are in the on state is substantially equal to the remainder $(I_M(n') \bmod (2^M \cdot I_0)) I_0$.

In a specific example, L=11 and M=4 are chosen.

According to the above embodiments, the switchable current branches of the IDAC 651 may each comprise a PMOS transistor and a switching element, such as a transistor.

Figure 6:
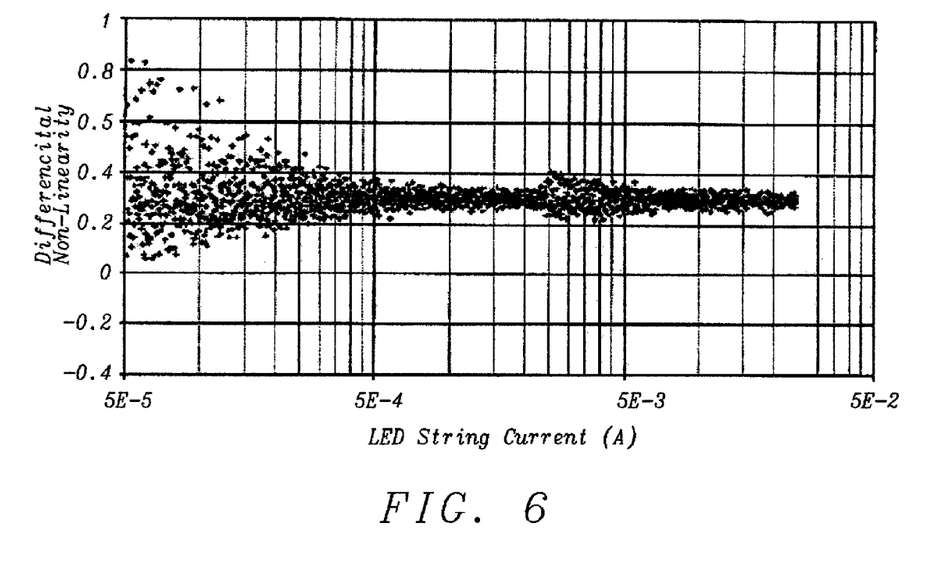
FIG. 6 is a graph illustrating DNL performance of the programmable current generator.

Due to the thermometric coding of the remaining bits on the MSB side of the digital input code, good DNL performance can be achieved without compromising current precision of the IDAC. FIG. 6 is a graph illustrating a relation between the current $I_{LED}$ flowing through the LED circuits 101 and the DNL (in %) for a specific example of the lighting system. The values of the DNL are centered at 0.3% and substantially bounded between 0.15% and 0.6%. For low current values, larger deviations from the 0.3% center value and DNL values higher than 0.6% are due to measurement errors. Deviations from 0.3% for larger current values are due to the approximation of a strictly monotonous exponential relationship that is chosen in the example, with variable slope linear segments. The rise of DNL values between $1 \cdot 10^{-3}$ A and $5 \cdot 10^{-3}$ A is due to the switching operation of the first variable resistance elements that will be explained below and may be addressed by appropriate current trimming.

Due to the binary coding of the predetermined number of bits on the LSB side of the digital input code, the addressing of the elements of the IDAC 651 is significantly simplified. Further, an area of the IDAC 651 may be considerably reduced compared to a purely thermometric IDAC. Further area reduction of the IDAC 651 results from employing the variable ratio r of resistance values of the first and second variable resistance elements discussed above. On the other hand, the DNL performance of the IDAC 651 is not noticeably impacted by the binary coding of the predetermined number of bits on the LSB side, due to the lower bit numbering (bit endianness) of the bits that are coded in accordance with binary coding. A remaining possible impact on the DNL performance, if any, can be countered by using 2-code trimming of each LED string current $I_{LED}$, as will be explained below.

As indicated at the outset of the description of FIG. 4, the above details relating to the current source 650 may be applied to any of the foregoing embodiments. Also, as will become immediately apparent to those of skill in the art, application of the IDAC 651 or the overall (programmable) current source 650 is not limited to LED lighting systems, and the IDAC 651 or the overall (programmable) current source 650 could also be used for other applications.

In the above embodiments, the first variable resistance elements may be configured such that a ratio between the resistance value of the respective first variable resistance element and the resistance value of the second resistance element corresponds to a ratio among a set of predetermined ratios, and moreover, as explained above, so that said ratio may be varied from one among the predetermined set of ratios to another one among the predetermined set of ratios. According to a specific example, the ratio $R_N/R_1$ may be either 1/2 or 1/20. This offers an additional possibility to control the current $I_{LED}$ that flows through the LED circuits 101.

According to the embodiments, the above ratio $R_N/R_1$ may be set in accordance with the numerical value n represented by the digital input code. In more detail, as long as the numerical value n represented by the digital input code is below a predetermined numerical threshold value, the resistance value of each first variable resistance element (one for each first circuit branch, i.e. one for each LED circuit 101) is set to such a value that the ratio between the resistance value of the respective first variable resistance element and the resistance value of the second variable resistance element becomes a first ratio, and if the numerical value n represented by the digital input code is not below the predetermined numerical threshold value, the resistance value of each first variable resistance element (one for each first circuit branch, i.e. one for each LED circuit 101) is set to such a value that the ratio between the resistance value of the respective first variable resistance element and the resistance value of the second variable resistance element becomes a second ratio smaller than the first ratio. In other words, the resistance value of each first variable resistance element is set to a smaller value if the numerical value is not below the numerical threshold value. The lighting system may comprise a dedicated controller (controlling means) for setting the resistance value of the first variable resistance elements in accordance with the numerical value represented by the digital input code, and/or for controlling the IDAC 651 (or, more generally, for controlling the current source 650), i.e. for feeding the digital input code to the IDAC 651 (or, more generally, to the current source 650). It is understood that for any ratio between the resistance value of the respective first variable resistance element and the resistance value of the second variable resistance element is inverse to the ratio between the current flowing through the respective first variable resistance element and the current flowing through the second variable resistance element (mirror ratio).

In the above setup according to any embodiment, control of the lighting system may be performed as described in the following. First, a target luminosity of the lighting system, which is e.g. set by a user or an application running on a device having the lighting system, is converted into the digital input code. The digital input code is then input to the IDAC 651 (or, more generally, to the current source 650). Next, it is determined whether or not the numerical value n represented by the digital input code is below the numerical threshold value. In accordance with a result of this determination, control is performed for each first variable resistance element. Accordingly, for each first variable resistance element, a ratio r between the resistance value of the respective first variable resistance element and the resistance value of the second variable resistance element is controlled to the first ratio if the numerical value n is below the numerical threshold value, and otherwise, if the numerical value n is not below the numerical threshold value, the ratio r between the resistance value of the respective first variable resistance element and the resistance value of the second variable resistance element is controlled to the second ratio smaller than the first ratio.

If the ratio r between the resistance value of the first variable resistance elements and the resistance value of the second variable resistance element is switched from the first ratio to the second ratio smaller than the first ratio upon an increase of the numerical value n (i.e. upon an increase of the target luminosity), the IDAC 651 (or, more generally, the current source 650) is controlled to reduce the output current $I_M$ in accordance with the decrease in the ratio r (i.e. in accordance with an increase in the ratio between the current flowing through the first variable resistance elements and the current flowing through the second variable resistance element). Thereby, a monotonous increase of the current $I_{LED}$ flowing through each LED circuit 101 is achieved for an increase of the numerical value n represented by the digital input code across the numerical threshold value. This reduction of the output current $I_M$ may be achieved by switching a number of current branches of the IDAC 651 from the conducting state to the non-conducting state. On the other hand, if the ratio r between the resistance value of the first variable resistance elements and the resistance value of the second variable resistance element is switched from the second ratio to the first ratio upon a decrease of the numerical value n (i.e. upon a decrease of the target luminosity), the IDAC 651 (or, more generally, the current source 650) is controlled to increase the output current $I_M$ in accordance with the increase in the ratio r (i.e. in accordance with a decrease in the ratio between the current flowing through the first variable resistance elements and the current flowing through the second variable resistance element). Thereby, a monotonous decrease of the current $I_{LED}$ flowing through each LED circuit 101 is achieved for a decrease of the numerical value n represented by the digital input code across the numerical threshold value. This increase of the output current $I_M$ may be achieved by switching a number of current branches of the IDAC 651 from the non-conducting state to the conducting state. In the above configuration, the desired output current $I_M(n)$ of the IDAC 651 (or, more generally, the current source 650) may be related to the numerical value n represented by the digital input code by a function that is strictly monotonously increasing up to the numerical threshold value, drops by a factor substantially corresponding to a ratio of said second ratio and said first ratio, and is strictly monotonous again for numerical values n beyond the numerical threshold value.

In a specific example, an 11-bit digital input code is used, and the ratio r is switched from the first ratio (e.g. 1/2) to the second ratio (e.g. 1/20) at the transition from code value 1282 to 1283. In this example, the function $I_M(n)$ is strictly monotonous for code values up to 1282, drops by a factor of substantially (1/20)/(1/2)=1/10 from code value 1282 to 1283, and is again strictly monotonous for code values larger than 1283.

The above switching of the ratio $r=R_N/R_1$ between the resistance value of the first variable resistance elements and the resistance value of, the second variable resistance element allows to decrease the required number of parallel current branches of the IDAC 651 for a given current resolution and thus goes along with a significant decrease in area of the IDAC 651 for a given current resolution.

It is to be understood that the number of numerical threshold values is not limited to one, and that two or more numerical threshold values for the numerical value n represented by the digital input code may be foreseen. In such cases, three or more ratios $R_N/R_1$ would need to be settable in the first variable resistance elements.

In summary, the pseudo-thermometric structure of, the IDAC combined with the variable ratio r (or the variable mirror ratio, which is the inverse of ratio r) allow for significant savings of area with respect to the fully thermometric case, without compromising DNL performance.

Next, a method for trimming the current in the lighting system employing the above switching operation of the current source and of the first variable resistance elements will be described. Therein, it is to be understood that this method is applicable to all embodiments described in the present disclosure.

First, the current $I_M$ output by the IDAC 651 (more generally, by the current source 650) is trimmed to a given current value at a given, but in principle arbitrary code value (i.e. numerical value represented by the digital input code). Then, for each first circuit branch, the current $I_{LED}$ flowing through the respective LED circuit 101 is trimmed to a given current value at the numerical value n immediately below the numerical threshold value. This is done by switching of the first switching elements 611. Any switching elements 611 that are switched to the non-conducting state at this point are not switched to the conducting state during PWM control while the first ratio is set. Lastly, for each first circuit branch, the current $I_{LED}$ flowing through the respective LED circuit 101 is trimmed to a given current value at the numerical value n+1 at the numerical threshold value, using, as trim target for the current, the trimmed current value for code n multiplied by the target DNL. This is again done by switching of the first switching elements 611. Any switching elements 611 that are switched to the non-conducting state at this point are not switched to the conducting state during PWM control while the second ratio is set.

By means of the above trimming operation, both the current $I_{LED}$ flowing through each LED circuit 101 as well as the DNL performance can be trimmed across the whole code range, especially since the transition point from the first ratio to the second ratio is the only critical point in terms of potential deviations of the DNL from its respective target value.

Next, a configuration and method for performing PWM control in the lighting system according to any of the above embodiments will be described with reference to FIG. 7. It is to be noted that the proposed scheme for PWM control does not interfere with the operation of the first feedback circuit 430.

Figure 7:
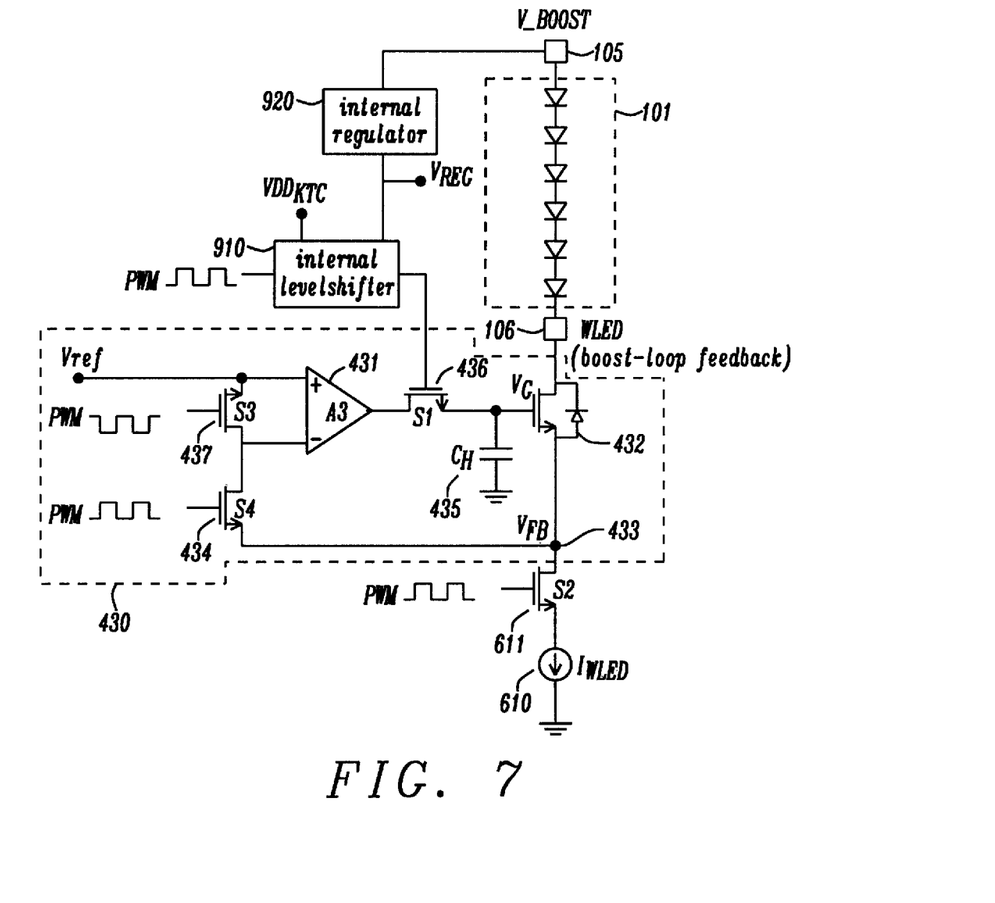
FIG. 7 shows a circuit diagram of a configuration that enables PWM control in the LED lighting systems according to the embodiments of the invention.

As can be seen from FIG. 7, the lighting system comprises, for each LED circuit 101 (i.e. for each first circuit branch), the first switching elements 611 that are switchable in accordance with a pulse width modulation, PWM, signal and connected between the respective first node 433 and the respective first variable resistance element, and a second switching element 434 (e.g. an NMOS transistor) that is provided in the respective first feedback circuit 430. As explained above, the lighting system comprises one first switching element 611 per first transistor element 610. Since those of the first switching elements 611 per first circuit branch that are switched during PWM control are switched simultaneously, it is sufficient for the purposes of the present description of PWM control to refer to one first switching element 611 per first circuit branch which stands representative for the one or more first switching elements 611 per first circuit branch. The second switching element 434 is configured to disconnect the respective first feedback circuit 430 when the first switching element 611 is switched to the non-conductive state (i.e. an open state, off state) by the PWM control. Accordingly, a PWM signal is supplied to the second switching element 434 that is substantially in phase with the PWM signal that is supplied to the first switching element 611.

Further, in each first feedback circuit 430, a third transistor element 432 (e.g. an NMOS transistor), which serves as a high-voltage switching element is provided and connected between the respective first node 433 and the respective LED circuit 101. A capacitor element 435 having a given capacitance is connected between a gate terminal of the third transistor element 432 and ground. Further, a third switching element 436 (e.g. an NMOS transistor) is arranged and configured to disconnect, in conjunction with the second switching element 434, the third transistor element 432 and the capacitor element 435 from the respective first feedback circuit 430 when the first switching element 611 is switched to the open state. Accordingly, a PWM signal is supplied to the third switching element 436 that is substantially in phase with the PWM signal that is supplied to the first switching element 611 and the second switching element 434.

The capacitor element 435 is connected to the gate of the third transistor element 432. Once the first feedback circuit 430 is disconnected (cut off) by the second and third switching elements 434, 436, the gate voltage of the third transistor element 435 is stored in the capacitor element 435. Therefore, even if the nodes of the respective first circuit branch are allowed to float free during the off state of the first switching element 611, the source-gate voltage $V_{gs}$ of the third transistor element 432 is kept almost constant. Accordingly, after the first switching element 611 is switched again to the on state (and also the second and third switching elements 434, 436 are switched again to the on state), control of the voltage at the first node 433 by the first feedback circuit 430 may be resumed almost instantaneously, regardless of a response speed of the first feedback circuit 430 (a settling time of the circuitry of the first feedback circuit 430). An internal regulator 920 (which may be part of the string driver) and an internal level shifter 910 guarantee that the third switching element 436 works properly in all conditions.

Each first feedback circuit 430 further comprises the first operational amplifier 431 (an operational amplifier element) that is connected with its output terminal to the gate terminal of the third transistor element 432 via the third switching element 436, as well as a fourth switching element 437 (e.g. an NMOS transistor) configured to short-circuit the differential input terminals of the first operational amplifier 431 when the first switching element 611 is switched to the open state. Accordingly, a PWM signal is supplied to the fourth switching element 437 that is substantially shifted by 180 degrees in phase with respect to the PWM signal that is supplied to the first switching element 611. Thus, while the first switching element 611 is switched to the off state, the first voltage is supplied to both terminals of the first operational amplifier 431, which provides a good starting point for resuming feedback control when the first switching element 611 is switched to the on state again (and also the second and third switching elements 434, 436 are switched again to the on state).

It is to be noted The PWM mechanism relies only on the proper timing of the PWM signals driving the first through fourth switching elements 611, 434, 436, 437, which can be easily achieved. On the other hand, the PWM mechanism does not rely on the settling times of the first operational amplifier 431 and other circuitry of the first feedback circuit 430, thus allowing for an extremely accurate PWM control in all load conditions.

As described earlier, the second circuit branch comprises the fifth switching element 621 that is of the same type as the first switching elements 611 and connected between the second node 443 and the second variable resistance element. The fifth switching element 621 is not switched and compensates for the impact of the first switching elements 611 (e.g. with regard to resistance/reactance, capacitance, and inductance), thereby ensuring perfect balance between the first and second circuit branches.

In summary, methods and circuits have been described to provide controllable current for one or more LED strings with only little voltage drop at the current source, thereby reducing power loss. The suggested circuits have good scalability to support many LED strings. Furthermore, methods and circuits have been described, having improved linearity, i.e. low differential non-linearity (DNL), and being dithering free.

Features, components and specific details of the structures of the above-described embodiments may be exchanged or combined to form further embodiments optimized for the respective application. As far as those modifications are readily apparent for an expert skilled in the art, they shall be disclosed implicitly by the above description without specifying explicitly every possible combination, for the sake of conciseness of the present description.

What is claimed is:
1. A lighting system comprising:
a plurality of light emitting diode, LED, circuits;
a power source for providing a drive voltage to the plurality of LED circuits;
for each LED circuit, a first variable resistance element connected between the respective LED circuit and ground;
for each LED circuit, a first feedback circuit configured to control a voltage at a first node between the respective LED circuit and the respective first variable resistance element to a first voltage;
a current source; and
a second variable resistance element connected between the current source and ground,
wherein each first variable resistance element is configured to attain a resistance value depending on a resistance value attained by the second variable resistance element.
2. The lighting system according to claim 1, further comprising a second feedback circuit configured to control a voltage at a second node between the current source and the second variable resistance element to a second voltage,
wherein the first voltage corresponds to the voltage at the second node or to the second voltage.
3. The lighting system according to claim 1, wherein the second variable resistance element is configured to attain a resistance value in dependence on a current output by the current source.
4. The lighting system according to claim 1, wherein each first variable resistance element is configured such that a ratio between the resistance value of the respective first variable resistance element and the resistance value of the second resistance element corresponds to a ratio among a set of predetermined ratios.

5. The lighting system according to claim 1, wherein each of the first variable resistance elements comprises a first transistor element;
the second variable resistance element comprises a second transistor element; and
each first transistor element and the second transistor element are biased to operate in the triode region.

6. The lighting system according to claim 5, wherein for each first transistor element, a gate terminal of the respective first transistor element is connected to a gate terminal of the second transistor element.

7. The lighting system according to claim 6, wherein the gate terminal of the second transistor element is connected to a third node between a drain terminal of the second transistor element and the current generator.

8. The lighting system according to claim 1, further comprising, for each LED circuit:
a first switching element switchable in accordance with a pulse width modulation, PWM, signal and connected between the respective first node and the respective first variable resistance element; and
a second switching element provided in the respective first feedback circuit and configured to disconnect the respective first feedback circuit when the first switching element is switched to an open state.

9. The lighting system according to claim 8, further comprising a fifth switching element connected between the second node and the second variable resistance element, wherein the fifth switching element is of the same type as each first switching element.

10. The lighting system according to claim 8, further comprising, for each LED circuit:
a third transistor element provided in the respective first feedback circuit and connected between the respective first node and the respective LED circuit;
a capacitor element connected between a gate terminal of the third transistor element and ground;
a third switching element configured to disconnect, in conjunction with the second switching element, the third transistor element and the capacitor element from the respective first feedback circuit when the first switching element is switched to the open state.

11. The lighting system according to claim 10, further comprising, for each LED circuit:
an operational amplifier element provided in the respective first feedback circuit and connected with its output terminal to the gate terminal of the respective third transistor element via the respective third switching element;
a fourth switching element configured to short-circuit the differential input terminals of the operational amplifier element when the first switching element is switched to the open state.

12. The lighting system according to claim 1, wherein the current source is a programmable current source configured to output an output current in accordance with a digital input code representing a numerical value by performing switching operation in accordance with the digital input code;
a predetermined number of bits on the least significant bit, LSB, side of the digital input code are switched in accordance with binary coding; and
a remaining number of bits on the most significant bit, MSB, side of the digital input code are switched in accordance with unary coding.

13. The lighting system according to claim 12, further comprising controlling means for controlling the current source and each first variable resistance element,
wherein the controlling means is configured to control, for each first variable resistance element, a ratio between the resistance value of the respective first variable resistance element and the resistance value of the second variable resistance element to a first ratio if a numerical value represented by the digital input code is below a numerical threshold value, and to a second ratio smaller than the first ratio if the numerical value is not below the numerical threshold value.

14. A method of controlling a lighting system according to claim 12, the method comprising the steps of:
converting a target luminosity of the lighting system to the digital input code;
inputting the digital input code to the programmable current source;
determining whether the numerical value represented by the digital input code is below a numerical threshold value;
controlling, for each first variable resistance element, a ratio between the resistance value of the respective first variable resistance element and the resistance value of the second variable resistance element to a first ratio if the numerical value is below the numerical threshold value;
controlling, for each first variable resistance element, the ratio between the resistance value of the respective first variable resistance element and the resistance value of the second variable resistance element to a second ratio smaller than the first ratio if the numerical value is not below the numerical threshold value; and
controlling the programmable current source to reduce the output current in accordance with a decrease in the ratio between the resistance value of the first variable resistance elements and the resistance value of the second variable resistance element.

15. The lighting system according to claim 12, wherein the current source comprises a plurality of current branches that are switchable in accordance with the digital input code, the output current corresponding to a sum of currents of those current branches that are switched to a conducting state;
a first group of current branches corresponding to the predetermined number of bits on the LSB side of the digital input code is switched in accordance with the predetermined number of bits on the LSB side of the digital input code, each current branch of the first group of current branches being configured to conduct a current that is in accordance with a bit numbering of the respective corresponding bit of the predetermined number of bits on the LSB side of the digital input code; and
a second group of current branches configured to conduct substantially equal currents is switched in accordance with the remaining bits on the MSB side of the digital input code.

16. The lighting system according to claim 15, wherein the current branches of the second group of current branches are consecutively switched to a conducting state in accordance with an increasing value of the numerical value represented by the digital input code.

17. The lighting system according to claim 15, wherein, if the digital input code is representative of an L-bit numerical value, and the predetermined number of bits on the LSB side of the digital input code is denoted by M, the first group of current branches comprises M current branches that are configured to conduct currents of substantially $(2^0) \cdot I_0$, $(2^1) \cdot$ $I_0, \ldots, (2^{M-1}) \cdot I_0$, respectively, $I_0$ being a base current, and the second group of current branches comprises at least $(2^{L-M})-1$ current branches that are each configured to conduct a current of substantially $(2^M) \cdot I_0$.

18. The lighting system according to claim 17, wherein, upon an increase of the numerical value represented by the digital input code:
- if a number of current branches of the second group of current branches that are in the on state is smaller than a largest integer divisor of a target output current corresponding to the numerical value represented by the digital input code and the current of substantially $(2^m) \cdot I_0$, current branches of the second group of current branches are switched to the on state so that the number of current branches of the second group of current branches that are in the on state matches said largest integer divisor, but none of the current branches of the second group of current branches is switched from the on state to the off state; and
- one or more of the current branches of the first group of current branches are switched so that the output current substantially matches the desired output current corresponding to the numerical value represented by the digital input code.

* * * * *